(12) United States Patent
Myung

(10) Patent No.: US 9,433,111 B2
(45) Date of Patent: Aug. 30, 2016

(54) DISPLAY APPARATUS

(71) Applicant: Samsung Electronics Co., Ltd., Suwon-si, Gyeonggi-do (KR)

(72) Inventor: Ji-eun Myung, Seoul (KR)

(73) Assignee: SAMSUNG ELECTRONICS CO., LTD., Suwon-Si (KR)

(*) Notice: Subject to any disclaimer, the term of this patent is extended or adjusted under 35 U.S.C. 154(b) by 174 days.

(21) Appl. No.: 13/955,278

(22) Filed: Jul. 31, 2013

(65) Prior Publication Data
US 2014/0063710 A1    Mar. 6, 2014

(30) Foreign Application Priority Data

Aug. 28, 2012 (KR) ................ 10-2012-0094549

(51) Int. Cl.
*H05K 5/00* (2006.01)
*G06F 1/16* (2006.01)

(52) U.S. Cl.
CPC .......... *H05K 5/0017* (2013.01); *G06F 1/1616* (2013.01); *G06F 1/1654* (2013.01); *G06F 1/1669* (2013.01); *G06F 1/1681* (2013.01); *G06F 1/1683* (2013.01); *G06F 1/1684* (2013.01); *G06F 2200/1632* (2013.01)

(58) Field of Classification Search
CPC .. G06F 1/1626; G06F 1/1632; G06F 1/1669; G06F 2200/1614; G06F 2200/1632; G06F 2200/1633; G06F 1/1656; G06F 1/166; G06F 1/1671; G06F 1/169; G06F 3/0231; G06F 3/147; G06F 1/1616; G06F 1/162; G06F 1/1622; G06F 1/1643; G06F 1/1666; G06F 1/1677; G06F 1/1679; G06F 1/1683; G06F 1/3203; G06F 1/3262; G06F 1/3271; G06F 3/0202; G06F 3/0221; Y10S 345/905; Y02B 60/1257

USPC ............. 361/679.09, 679.15, 679.19, 679.2, 361/679.26, 679.3, 679.4, 679.44, 724; 345/905, 169, 173, 179, 204
See application file for complete search history.

(56) References Cited

U.S. PATENT DOCUMENTS

| | | | | |
|---|---|---|---|---|
| 5,422,442 | A * | 6/1995 | Gouda et al. | 178/19.01 |
| 5,657,210 | A * | 8/1997 | Yamanaka | G08B 3/1058 340/7.63 |
| 5,983,073 | A * | 11/1999 | Ditzik | 455/11.1 |
| 6,392,639 | B1 * | 5/2002 | Lee et al. | 345/179 |
| 6,919,864 | B1 * | 7/2005 | Macor | G06F 1/1601 345/1.1 |
| 6,980,420 | B2 * | 12/2005 | Maskatia et al. | 361/679.57 |
| 7,283,353 | B1 * | 10/2007 | Jordan | G06F 1/1601 248/122.1 |
| 7,298,610 | B2 * | 11/2007 | Kim et al. | 361/679.55 |
| 8,085,253 | B2 * | 12/2011 | Oveisi | 345/179 |
| 8,208,245 | B2 * | 6/2012 | Staats et al. | 361/679.02 |
| 8,498,100 | B1 * | 7/2013 | Whitt et al. | 361/679.17 |
| 2007/0097087 | A1 * | 5/2007 | Homer et al. | 345/173 |
| 2011/0194232 | A1 * | 8/2011 | Saila | 361/679.01 |
| 2012/0327594 | A1 * | 12/2012 | Gengler | G06F 1/1632 361/679.56 |

* cited by examiner

*Primary Examiner* — Hung S Bui
*Assistant Examiner* — Michael Matey
(74) *Attorney, Agent, or Firm* — Staas & Halsey LLP

(57) ABSTRACT

A display apparatus comprises a main body including a touch screen disposed on a front surface thereof; an accessory unit rotatably disposed with respect to the main body; a connecting rod disposed in a side surface of one of the main body and the accessory unit; and a connecting channel disposed in a side surface of the other of the accessory unit and the main body, the connecting channel being formed so that the connecting rod is inserted in or separated from the connecting channel in a lengthwise direction thereof.

17 Claims, 16 Drawing Sheets

DISPLAY APPARATUS

CROSS-REFERENCE TO RELATED APPLICATIONS

This application claims the benefit under 35 U.S.C. §119 (a) from Korean Patent Application No. 2012-0094549 filed Aug. 28, 2012 in the Korean Intellectual Property Office, the disclosure of which is incorporated herein by reference in its entirety.

BACKGROUND OF THE INVENTION

1. Field of the Invention

The present general inventive concept relates to an electronic apparatus having a touch screen. More particularly, the present general inventive concept relates to an electronic apparatus including a touch screen and an accessory, like a keyboard, which can be detachably disposed in the electronic apparatus to use.

2. Description of the Related Art

According to the development of touch screen technology, electronic apparatuses that can be operated only by the touch screen, tablet PCs for example, are becoming more widespread.

However, since the electronic apparatus like the tablet PC is operated only by touch of the touch screen, there is a problem that when a user needs to type a lot of characters and/or symbols, such as creating a document, the typing work is inconvenient.

For solving the problem, an input apparatus, such as a keyboard, has been provided as an accessory that can be connected to the tablet PC to use.

Generally, a conventional keyboard is provided in the form of a stand in which the tablet PC is erected and secured. At this time, the keyboard is provided with a channel portion in which the tablet PC is inserted, and the channel portion is connected by a hinge so as to rotate with respect to a main body of the keyboard. As a result, an angle between the keyboard and the tablet PC connected to the channel portion can be adjusted. Also, the channel portion is provided with a fixing means to fix the tablet PC. For example, a latch and hook structure can be used as the fixing means.

However, since the conventional keyboard includes a hinge structure in the channel portion so that the tablet PC can be rotated a certain angle, there is a problem that the conventional keyboard has a complex structure.

Since the fixing means to fix the tablet PC to the channel portion is needed, there is also a problem that the structure of the conventional keyboard is complex.

Since the conventional tablet PC and keyboard are carried about in a separate state, there is also a problem that carrying them is inconvenient.

SUMMARY OF THE INVENTION

The present general inventive concept has been developed in order to overcome the above drawbacks and other problems associated with the conventional arrangement described above. An aspect of the present general inventive concept relates to a display apparatus that has a simple connection structure so that the connection and separation of a main body and an accessory thereof are easy.

Additional features and utilities of the present general inventive concept will be set forth in part in the description which follows and, in part, will be obvious from the description, or may be learned by practice of the general inventive concept.

The above features and utilities of the present general inventive concept can be achieved by providing a display apparatus, which may include a main body including a touch screen disposed on a front surface thereof; an accessory unit rotatably disposed with respect to the main body; a connecting rod disposed in a side surface of one of the main body and the accessory unit; and a connecting channel disposed in a side surface of the other of the accessory unit and the main body, the connecting channel being formed so that the connecting rod is inserted in or separated from the connecting channel in a lengthwise direction thereof.

The connecting rod may have a circular cross-section, and the connecting channel may have an arc cross-section corresponding to the circular cross-section.

When the connecting rod is inserted into the connecting channel, the connecting rod and connecting channel may be formed to generate a friction force that can support a weight of the main body.

The connecting rod may be disposed to be spaced apart from the side surface of the main body or the accessory unit by a pair of fixing members that is formed on the side surface of the main body or the accessory unit.

A top portion of the connecting channel may have an opening so that the pair of fixing members can pass through the connecting channel, and the connecting channel may include a front portion and a rear portion that are formed to pass through a gap between the connecting rod and the side surface of the main body or the accessory unit.

A length of the connecting channel may be shorter than a distance between the pair of fixing members.

Opposite ends of the connecting rod may be formed to be inserted into the connecting channel, and when the connecting rod is inserted in the connecting channel from a first end of the connecting rod, a front surface of the main body faces a front surface of the accessory unit, and when the connecting rod is inserted in the connecting channel from a second end of the connecting rod, a rear surface of the main body faces the front surface of the accessory unit.

At least one contact point to electrically connect the main body and the accessory unit may be provided between the connecting rod and the connecting channel.

The main body may include a tablet PC, and the accessory unit may be a keyboard.

A rechargeable battery may be disposed in the accessory unit.

At least one USB port and at least one memory slot may be disposed in the accessory unit.

The display apparatus may include a male connector disposed in a side of the connecting channel and spaced apart from the connecting channel, and a female connector disposed in each of the opposite ends of the connecting rod and separately connected to the male connector.

A digitizer pen may be detachably disposed in an end of the connecting rod.

The foregoing and/or other features and utilities of the present general inventive concept may also be achieved by providing a tablet PC comprising a main body including a touch screen disposed on a front surface thereof; and a connecting rod disposed in a side surface of the main body and spaced apart a predetermined distance from the side surface, wherein the connecting rod can be inserted into a connecting channel formed on a keyboard.

The connecting rod may be fixed to the side surface of the main body by a pair of fixing members.

The connecting rod may have the same length as the main body; and the pair of fixing members may be disposed to fix opposite end portions of the connecting rod.

The foregoing and/or other features and utilities of the present general inventive concept may also be achieved by providing a keyboard apparatus comprising an accessory unit including a keyboard disposed on a front surface thereof; and a connecting channel disposed in an end of the front surface of the accessory unit and formed parallel to the keyboard, wherein a connecting rod of a tablet PC can be removably inserted into the connecting channel.

The connecting rod may have a circular cross-section, and the connecting channel may have an arc cross-section corresponding to the circular cross-section.

With a display apparatus according to embodiments of the present general inventive concept, connection and separation of the main body and the accessory unit are easy since a connection structure for connecting a main body and an accessory unit is formed in a rod and a channel.

Also, a display apparatus according to embodiments of the present general inventive concept has a simple connection structure, but an angle between a main body and an accessory unit thereof can be variously adjusted like conventional notebook computers.

Also, with a display apparatus according to embodiments of the present general inventive concept, when a main body is coupled to an accessory unit so that a touch screen of the main body faces a front surface of the accessory unit, the display apparatus can be used in a similar way to a notebook computer. In addition, when the main body is coupled to the accessory unit so that a rear surface of the main body with no touch screen faces the front surface of the accessory unit, the display apparatus can be used in a similar way to a tablet PC. Therefore, the usability of the display apparatus can be improved.

The foregoing and/or other features and utilities of the present general inventive concept may also be achieved by providing a display apparatus comprising a main body including a touch display portion, a pair of fixing members, and a connecting rod such that the pair of fixing members are disposed between the display portion and the connecting rod to define a gap; and an accessory unit rotatable with respect to the main body and including a connecting channel disposed at one side surface thereof to removably receive the connecting rod.

The connecting rod may have a first end and a second end and may be formed so that either one of the first and second ends can be inserted into the connecting channel.

An inner diameter of the connecting channel may correspond to an outer diameter of the connecting rod so that, when the connecting rod is inserted into the connecting channel, friction occurs between an outer surface of the connecting rod and an inner surface of the connecting channel to prevent the connecting rod from freely rotating with respect to the connecting channel.

The friction between the connecting rod and the connecting channel may have a magnitude that can support the weight of the main body.

At least one contact point may be provided between the connecting rod and the connecting channel to electrically connect the main body and the accessory unit.

A plurality of contact points may be provided between the connecting rod and the connecting channel to electrically connect the main body and the accessory unit such that a single contact point performs a sensor function to detect a direction in which the main body is connected to the accessory unit, and the main body may be configured to change the arrangement of the plurality of contact points by using a signal from the single contact point that performs the sensor function.

A slot may be provided in one end of the connecting rod so that a digitizer pen can be separated from, and securably inserted into, the connecting rod.

The connecting channel may include a pair of fixing member grooves formed to correspond to the pair of fixing members so that, when the main body is rotated, the pair of fixing members do not interfere with the connecting channel such that the main body can be rotated in a first direction until the main body is in contact with the front surface and the main body can be rotated in a second direction until the main body and the accessory unit are on the same plane.

The foregoing and/or other features and utilities of the present general inventive concept may also be achieved by providing a display apparatus comprising an accessory unit including an input portion, a pair of fixing members, and a connecting rod such that the pair of fixing members are disposed between the input portion and the connecting rod to define a gap; and a main body rotatable with respect to the accessory unit and including a touch display portion disposed on a first surface and a connecting channel disposed at one side surface thereof to removably receive the connecting rod.

BRIEF DESCRIPTION OF THE DRAWINGS

These and/or other features and utilities of the present general inventive concept will become apparent and more readily appreciated from the following description of the embodiments, taken in conjunction with the accompanying drawings of which:

FIG. 12A is a partially perspective view illustrating a display apparatus according to an embodiment of the present general inventive concept with a connecting rod in which a digitizer pen is kept in;

Throughout the drawings, like reference numerals will be understood to refer to like parts, components and structures.

DETAILED DESCRIPTION OF THE PREFERRED EMBODIMENTS

Figure 1:
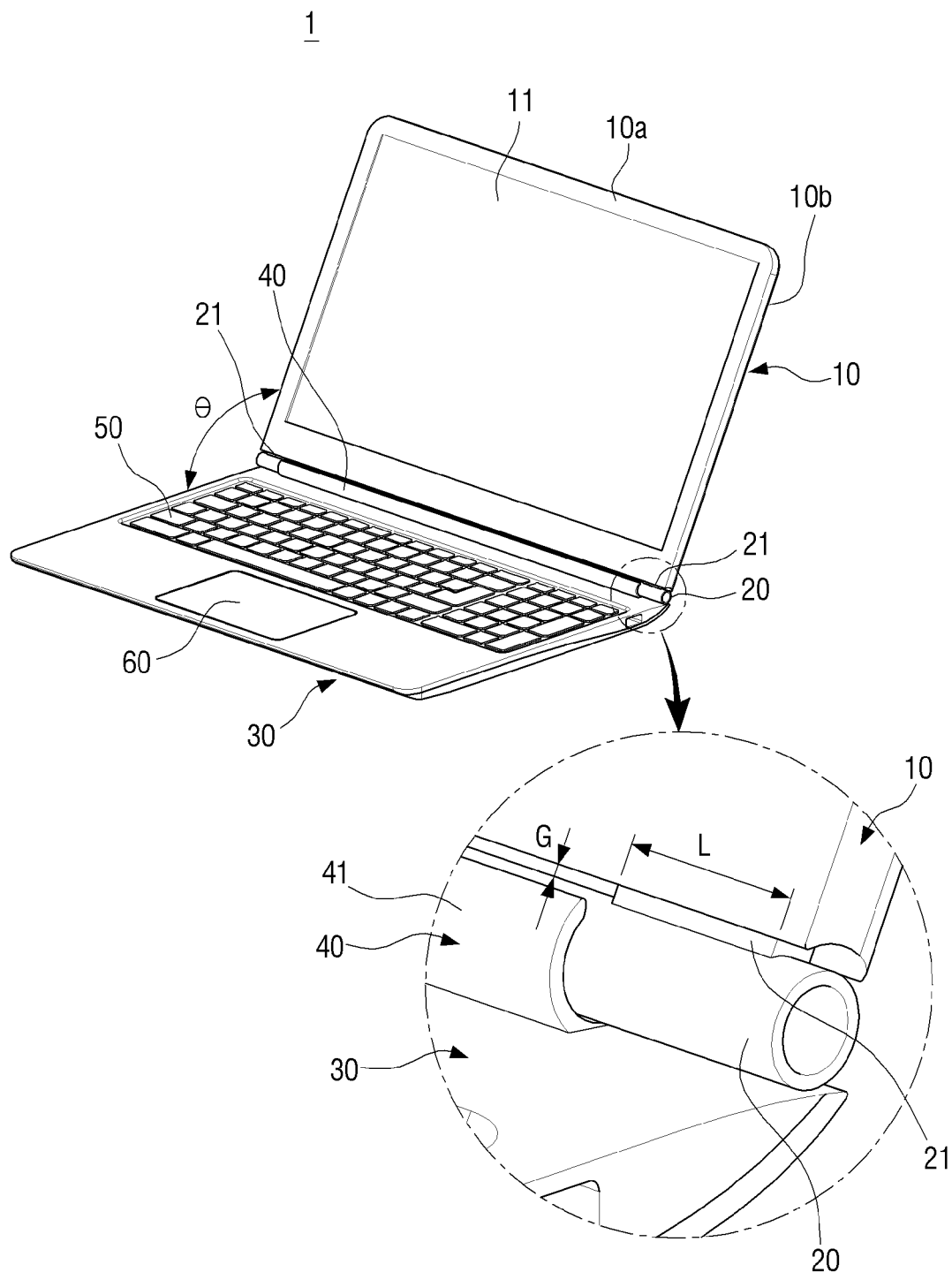
FIG. 1 is a perspective view illustrating a display apparatus according to an embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

The matters defined herein, such as a detailed construction and elements thereof, are provided to assist in a comprehensive understanding of this description. Thus, it is apparent that exemplary embodiments may be carried out without those defined matters. Also, well-known functions or constructions are omitted to provide a clear and concise description of exemplary embodiments. Further, dimensions of various elements in the accompanying drawings may be arbitrarily increased or decreased for assisting in a comprehensive understanding.

Figure 2:
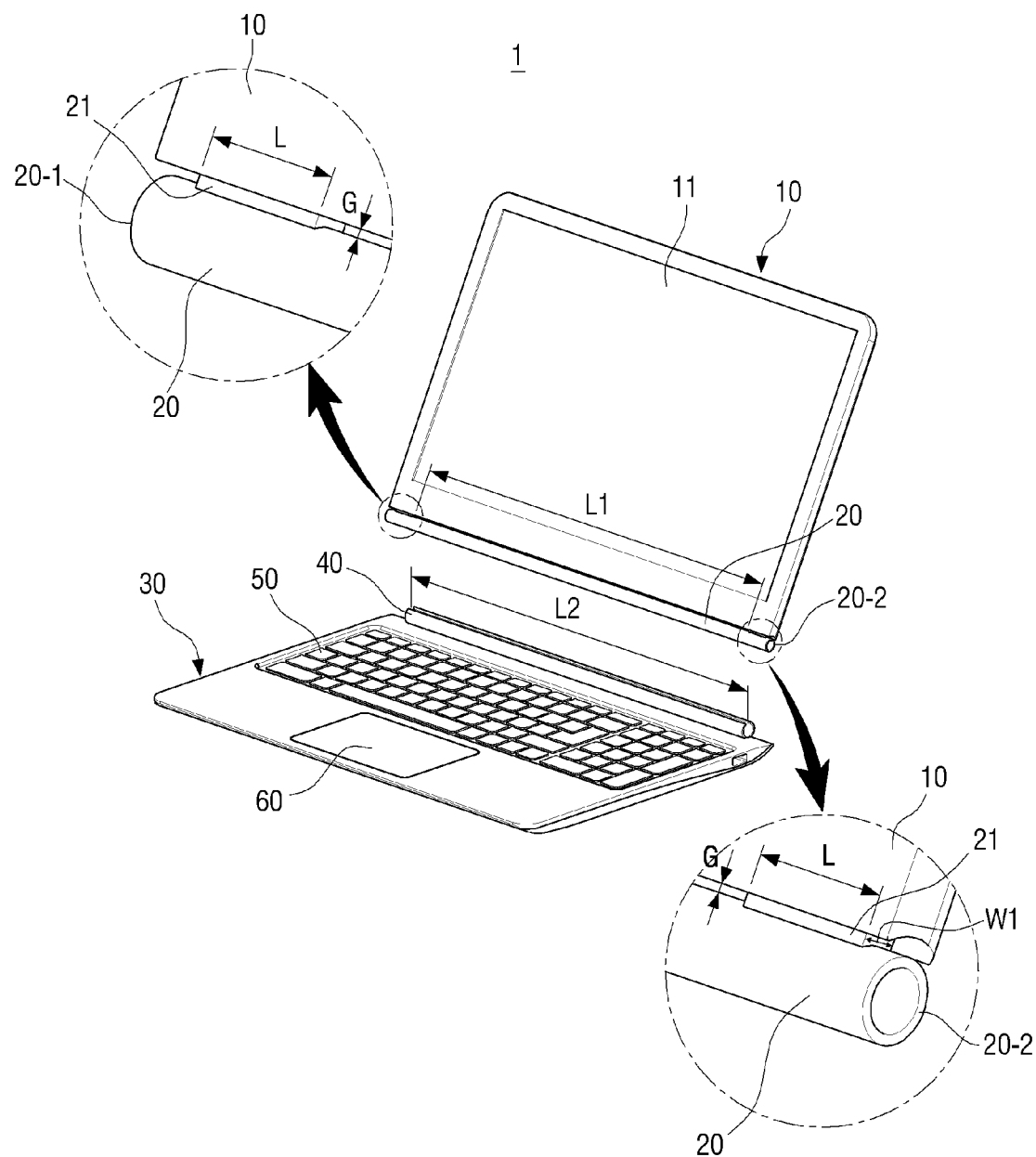
FIG. 2 is an exploded perspective view illustrating a display apparatus according to an embodiment of the present general inventive concept.

FIG. 1 is a perspective view illustrating a display apparatus according to an embodiment of the present general inventive concept, and FIG. 2 is an exploded perspective view illustrating a display apparatus according to an embodiment of the present general inventive concept. The display apparatus that will be used in the below description may include all electronic apparatuses that have a touch screen, can be operated by touch of the touch screen, and can be used to connect to an accessory unit such as a keyboard, a digitizer panel, etc. Such an electronic apparatus may include a tablet PC, a smart phone, an eBook device, etc.; however, the electronic apparatus is not limited by them.

Referring to FIGS. 1 and 2, a display apparatus 1 according to an embodiment of the present general inventive concept may include a main body 10 and an accessory unit 30.

The main body 10 may have a shape of an approximately rectangular parallelepiped body and may be formed in a plate shape having a lower height. A touch screen 11 is disposed on a front surface 10a of the main body 10. Accordingly, the main body 10 may be formed as a conventional tablet personal computer (hereinafter, referred to as tablet PC).

Various parts that allow the main body 10 to receive commands from the touch screen 11 and to perform a variety of functions are disposed inside the main body 10. For example, parts, such as a processing unit, a storage unit, a power unit, an interface unit, etc., are disposed inside the main body 10. The parts, such as the processing unit, the storage unit, the power unit, the interface unit, etc., can use parts as the same as or similar to those of the conventional tablet PC; therefore, detail descriptions thereof will be omitted.

A connecting rod 20 is disposed in one side surface of the main body 10. The connecting rod 20 may be fixed to the one side surface of the main body 10 by a pair of fixing members 21 so that the connecting rod 20 is spaced apart a predetermined distance from the one side surface of the main body 10.

A gap G between the connecting rod 20 and the one side surface of the main body 10 is determined by the pair of fixing members 21. A front portion 41 and a rear portion 42 of a connecting channel 40 as described later can pass through the gap G between the connecting rod 20 and the one side surface of the main body 10. Accordingly, the gap G between the connecting rod 20 and the one side surface of the main body 10 may be adjusted depending on thickness t of the front portion 41 and rear portion 42 of the connecting channel 40. For example, if the thickness t of each of the front portion 41 and rear portion 42 of the connecting channel 40 of the accessory unit 30 is thick, the gap G of the connecting rod 20 may be formed to be wide. If the thickness t of each of the front portion 41 and rear portion 42 of the connecting channel 40 of the accessory unit 30 is thin, the gap G of the connecting rod 20 may be formed to be narrow.

The pair of fixing members 21, as illustrated in FIG. 2, may be disposed adjacent to opposite ends of the one side surface of the main body 10. Alternatively, the pair of fixing members 21 may be disposed so that an end of each of the fixing members 21 is aligned to each of the opposite ends of the one side surface of the main body 10. Each of the fixing members 21 may be formed to have a length L that allows the connecting rod 20 to be firmly fixed to the main body 10.

The connecting rod 20 may be formed in a hollow circular pipe. The connecting rod 20 may be formed to have the same outer diameter and inner diameter across the entire length thereof. The connecting rod 20 may be formed of a metal or a synthetic resin with a proper strength. According to embodiments of the present general inventive concept, the connecting rod 20 may be formed to have the same length as that of the one side surface of the main body 10.

Figure 3:
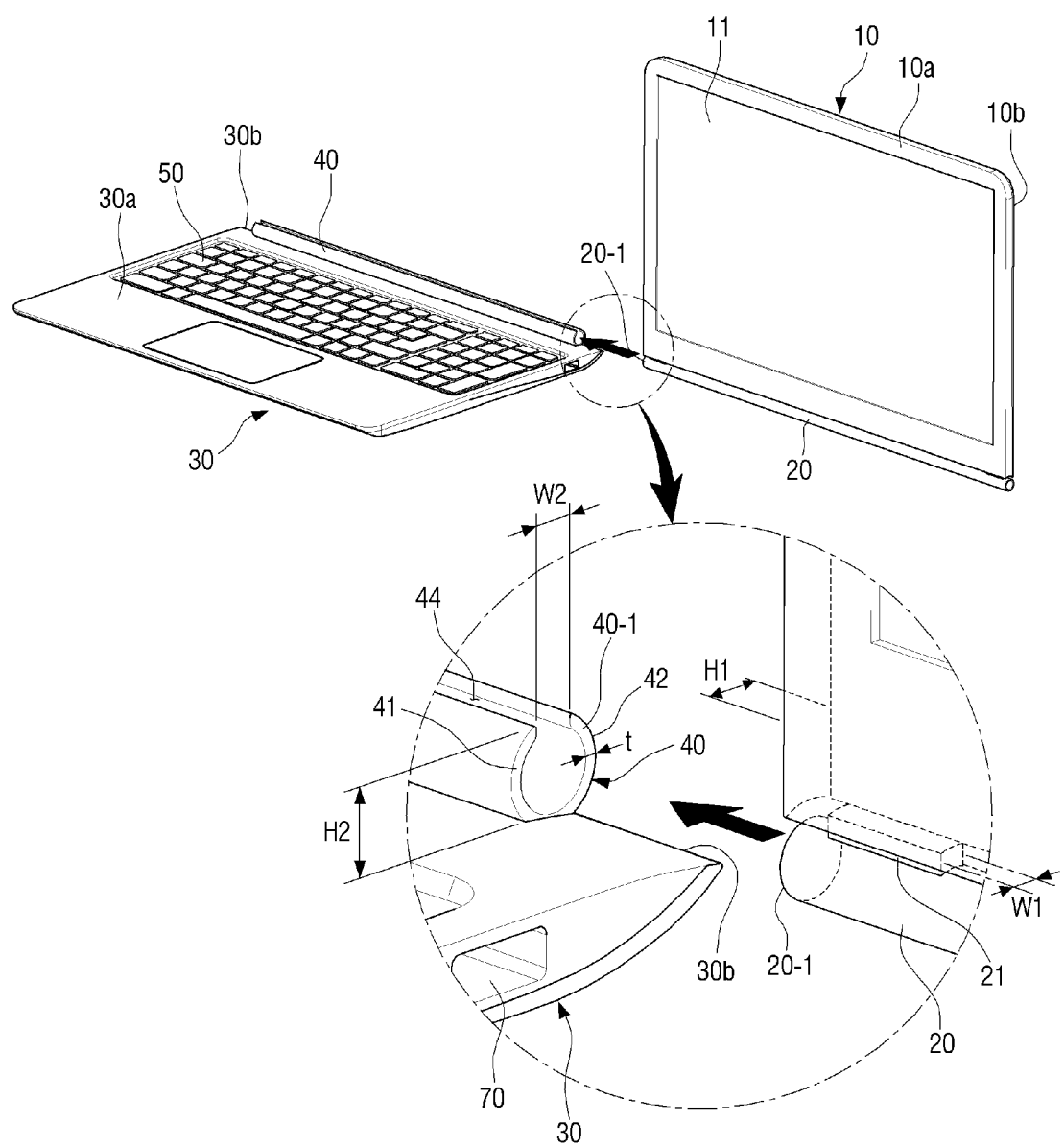
FIG. 3 is a perspective view illustrating when a connecting rod and a connecting channel are aligned with each other in order to connect an accessory unit to a main body of a display apparatus according to an embodiment of the present general inventive concept.

Also, the connecting rod 20 may be formed so that opposite ends 20-1 and 20-2 of the connecting rod 20 can be inserted into the connecting channel 40 formed on the accessory unit 30. For example, as illustrated in FIG. 3, a first end 20-1 of the connecting rod 20 may be inserted into an insert end 40-1 of the connecting channel 40, and then the connecting rod 20 is pushed in the connecting channel 40 so that the connecting rod 20 and the connecting channel 40 are connected to each other. Also, a second end 20-2 of the connecting rod 20 may be inserted into the insert end 40-1 of the connecting channel 40, and then the connecting rod 20 is pushed in the connecting channel 40 so that the connecting rod 20 and the connecting channel 40 are connected to each other. In this case, in a state that the main body 10 of FIG. 3 is overturned, that is, in a state that a rear surface 10b of the main body 10, on which no touch screen 11 is disposed, faces the accessory unit 30, the main body 10 may be connected to the accessory unit 30.

The accessory unit 30 may be disposed to rotate with respect to the main body 10, and can perform additional functions with respect to the main body 10. The accessory unit 30 may include various things as long as they can perform the additional functions with respect to the main body 10. In other words, the accessory unit 30 may include a variety of electronic accessories that can be connected to an electronic apparatus to use. For example, the accessory unit 30 may include a keyboard apparatus to input data of characters or symbols or a digitizer apparatus to input location relationships or coordination information of figures or shapes. In the below description, the accessory unit 30 will be described based on the keyboard apparatus.

The accessory unit 30 may be formed to have a shape and size corresponding to the main body 10. A keyboard 50 and the connecting channel 40 are disposed on a front surface 30a of the accessory unit 30. The keyboard 50 may be the same as a conventional keyboard, and therefore a detailed description thereof will be omitted.

The keyboard 50 may not be disposed to protrude from the front surface 30a of the accessory unit 30 so that, when the front surface 30a of the accessory unit 30 is in contact with the main body 10, the keyboard 50 is not pressed by the main body 10. Additionally, a touch pad 60 may be disposed on the front surface 30a of the accessory unit 30 in the same manner as conventional notebook computers.

The connecting channel 40 may be formed so that the connecting rod 20 of the main body 10 is inserted into, or separated from, the connecting channel 40 in a lengthwise direction thereof, and is disposed parallel to the keyboard 50 in a lengthwise direction of the keyboard 50 at an upper side of the keyboard 50. The connecting channel 40 may be disposed adjacent to an upper side end 30b of the accessory unit 30 on the front surface 30a of the accessory unit 30. Alternatively, the connecting channel 40 may be disposed on the front surface 30a of the accessory unit 30 so that the rear portion 42 of the connecting channel 40 is aligned to the upper side end 30b of the accessory unit 30.

The connecting channel 40 may be formed in an arc shape to surround the connecting rod 20. Accordingly, the connecting channel 40 may be formed to have an inner diameter corresponding to an outer diameter of the connecting rod 20. The connecting rod 20 and connecting channel 40 are formed so that, when the connecting rod 20 is inserted in the connecting channel 40, friction occurs between an outer surface of the connecting rod 20 and an inner surface of the connecting channel 40, thereby preventing the connecting rod 20 from freely rotating with respect to the connecting channel 40. In other words, when the connecting rod 20 is inserted in the connecting channel 40 so that the accessory unit 30 is connected to the main body 10, as illustrated in FIG. 1, the main body 10 in which the connecting rod 20 is disposed does not rotate freely with respect to the accessory unit 30 in which the connecting channel 40 is disposed. However, when a user applies a certain force to the main body 10, the main body 10 may be rotated with respect to the accessory unit 30 so that an angle θ between the main body 10 and the accessory unit 30 can be changed. Accordingly, the friction force between the connecting rod 20 and the connecting channel 40 at least has the magnitude that can support the weight of the main body 10.

In an alternative embodiment of the present general inventive concept, an anti-rotation member (not illustrated) may be disposed between the connecting rod 20 and the connecting channel 40 to prevent the main body 10 from rotating with respect to the accessory unit 30. The anti-rotation member may utilize anti-rotation members that can be used in a hinge structure of conventional notebook computers, etc., and therefore a detailed description thereof will be omitted.

An opening 44 (see FIG. 3) may be formed on a top portion of the connecting channel 40 in a lengthwise direction thereof. The opening 44 of the connecting channel 40 may be formed so that the pair of fixing members 21 of the main body 10 can pass through the opening 44. As a result, a width W2 of the opening 44 of the connecting channel 40 is formed larger than the width W1 of the fixing members 21 of the connecting rod 20. Also, a height H2 of the connecting channel 40 may be formed lower than a height H1 of the main body 10 so that, when the front surface 10a of the main body 10 is in close contact with the front surface 30a of the accessory unit 30, the connecting channel 40 does not protrude from the main body 10.

The thickness t of each of the front portion 41 and rear portion 42 of the connecting channel 40 may be formed to have a size smaller than a size of the gap G between the connecting rod 20 and a side surface of the main body 10. As a result, the front and rear portions 41 and 42 of the connecting channel 40 can pass through the gap G between the connecting rod 20 and the side surface of the main body 10, and thus, when the connecting rod 20 is inserted into the connecting channel 40, the main body 10 to which the connecting rod 20 is attached can freely rotate with respect to the accessory unit 30 in which the connecting channel 40 is disposed.

Also, the connecting channel 40 may be formed to have a length L2 shorter than a distance (or gap) L1 between the pair of fixing members 21 disposed in the main body 10. Accordingly, when the connecting rod 20 is inserted in the connecting channel 40, the connecting channel 40 does not interfere with the fixing members 21 of the main body 10. Therefore, the main body 10 to which the connecting rod 20 is attached can freely rotate with respect to the accessory unit 30 in which the connecting channel 40 is disposed.

As illustrated in FIG. 1, the accessory unit 30 may be configured to support the main body 10 so that the main body 10 is tilted at a certain angle on the bottom surface thereof. Accordingly, the accessory unit 30 may be heavier than the main body 10. For this, a power supplying unit (not illustrated) may be disposed in the accessory unit 30. A battery may be used as the power supplying unit. The battery may use interchangeable disposable batteries or rechargeable batteries.

Also, an interface unit 70, that connects the accessory unit 30 to a peripheral device (not shown) to extend the function of the main body 10, may be disposed in the accessory unit 30. The display apparatus 1 according to embodiments of the present general inventive concept may include at least one USB port and at least one memory slot disposed in the accessory unit 30.

When the main body 10 is an electronic apparatus and the accessory unit 30 is an apparatus that can input commands or data into the electronic apparatus, the main body 10 and the accessory unit 30 can be electrically connected to each other.

Figure 8A:
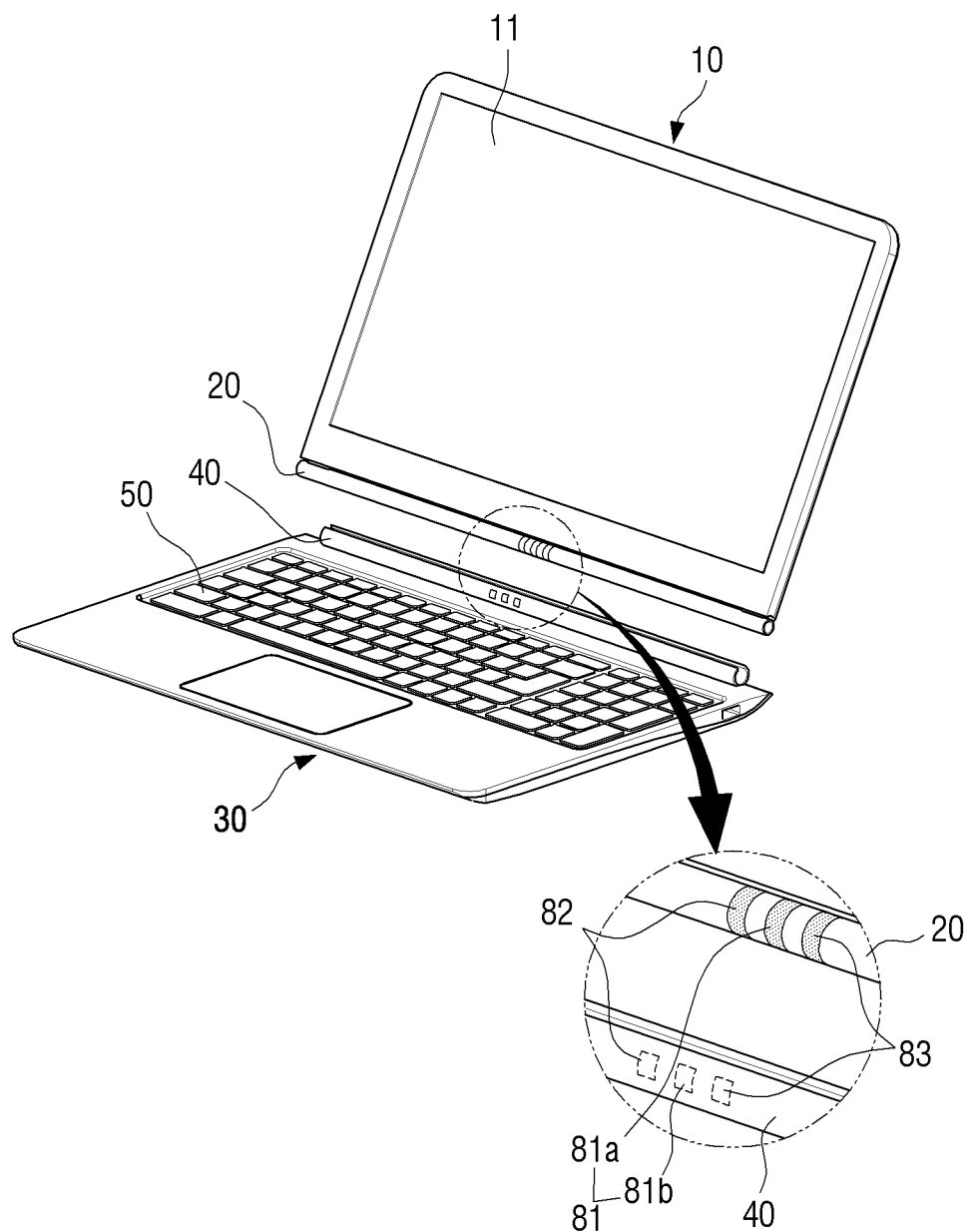
FIG. 8A is a perspective view illustrating contact points formed on a connecting rod and a connecting channel as one example of electrical connection of a display apparatus according to an embodiment of the present general inventive concept.

For electrical connection of the main body 10 and the accessory unit 30, at least one contact point 81, 82, and 83 may be provided between the connecting rod 20 and the connecting channel 40. The at least one contact point 81, 82, and 83 may be disposed on a middle portion in the lengthwise direction of the connecting rod 20. For example, when the main body 10 is a tablet PC, and the accessory unit 30 comprises a keyboard apparatus including the keyboard 50 and the power supplying unit, as illustrated in FIG. 8A, two signal contact points 82 and 83 and a power contact point 81 may be provided between the connecting rod 20 and the connecting channel 40. In FIG. 8A, a central contact point 81 is the power contact point to supply electric power, and contact points 82 and 83 disposed to the left and right of the central contact point 81 may be a keyboard contact point 82 to transmit keyboard signals and a USB contact point 83 connected to a USB port.

Figure 4:
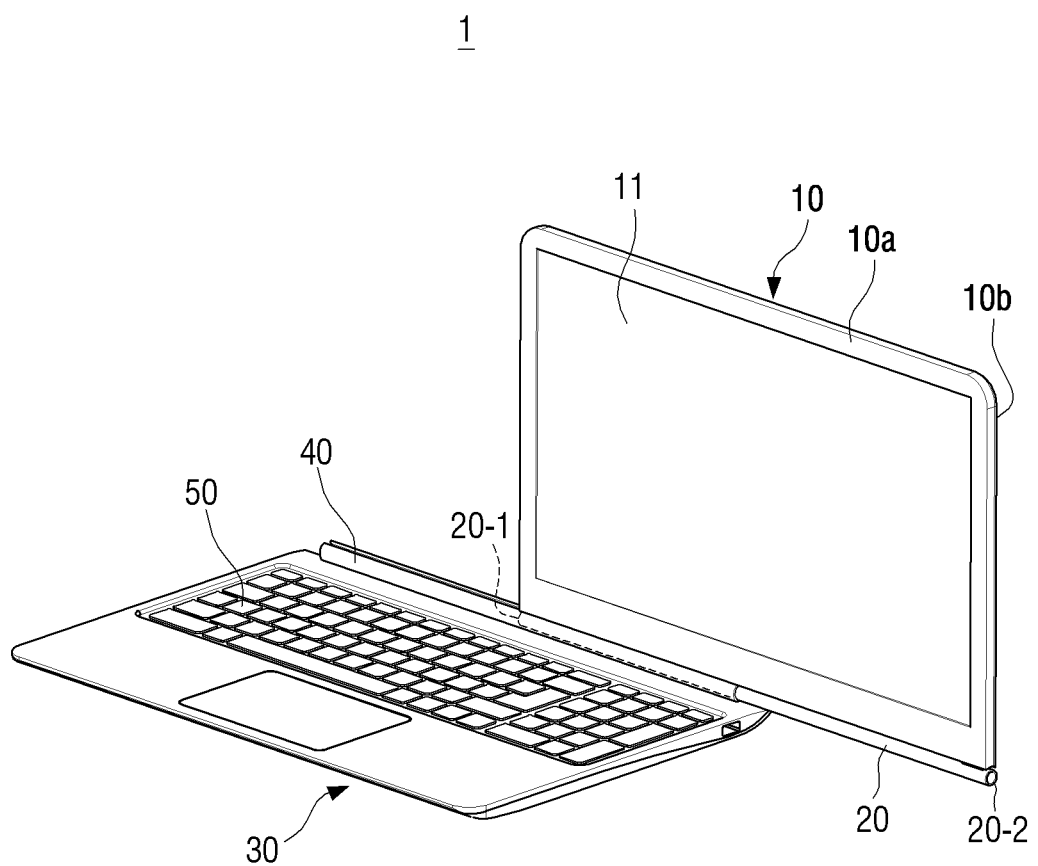
FIG. 4 is a perspective view illustrating when an accessory unit is being connected to a main body of a display apparatus according to an embodiment of the present general inventive concept.
Figure 5:
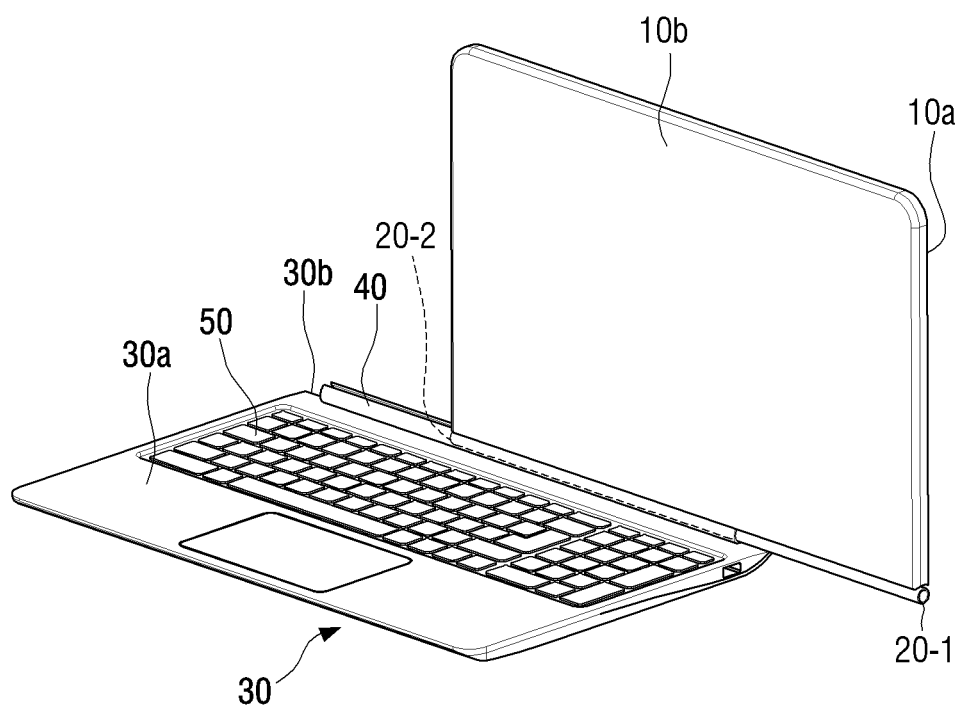
FIG. 5 is a perspective view illustrating when an accessory unit is being connected to a main body of a display apparatus according to an embodiment of the present general inventive concept while a touch screen of the main body does not face a keyboard.

The display apparatus 1, according to embodiments of the present general inventive concept, may be configured so that the main body 10 is connected to the accessory unit 30 in two kinds of ways. In other words, there may be a first way in which, while the touch screen 11 faces the keyboard 50, as illustrated in FIGS. 3 and 4, the connecting rod 20 of the main body 10 is connected to the connecting channel 40 of the accessory unit 30, and there may be a second way in which, while the rear surface 10b of the main body 10, namely, a surface thereof with no touch screen 11, faces the keyboard 50 as illustrated in FIG. 5, the connecting rod 20 of the main body 10 is connected to the connecting channel 40 of the accessory unit 30.

If the direction in which the main body 10 is coupled to the accessory unit 30 is changed, as described above, positions of the contact points provided on the connecting rod 20 may be changed as well. Accordingly, the contact points 81, 82, and 83, to electrically connect the main body 10 and the accessory unit 30, may be configured in consideration of this. For example, if a single contact point is used, the single contact point is disposed at a center in the lengthwise direction of the connecting rod 20. Also, if a plurality of contact points 81, 82, and 83 are used, one contact point may be configured to perform a sensor function to detect the direction in which the main body 10 is connected to the accessory unit 30, and the main body 10 may be configured to change the arrangement of the contact points by using a signal of the sensor function contact point and to receive signals. The arrangement of the contact points as described above can use conventional technologies, and therefore a detailed description thereof will be omitted.

Figure 8B:
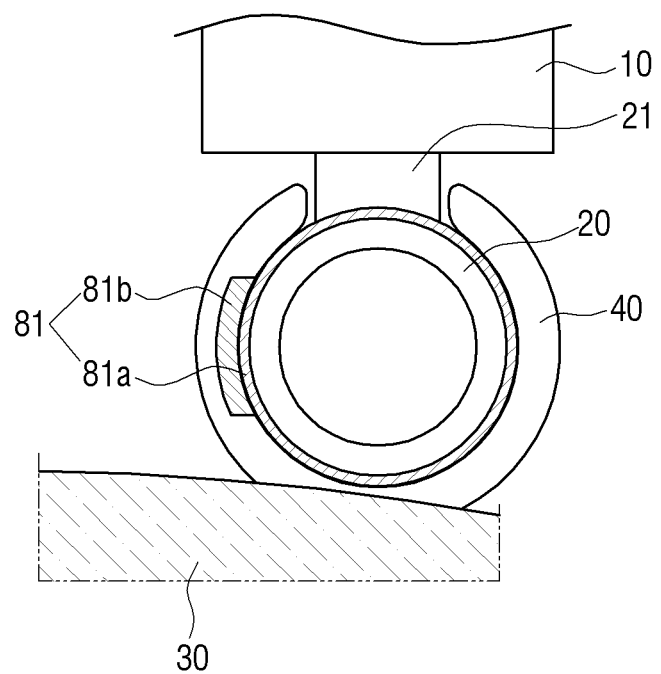
FIG. 8B is a sectional view illustrating a contact point formed on the connecting rod and connecting channel of FIG. 8A.

FIG. 8B is a sectional view illustrating one example of a structure of a contact point provided between the connecting rod 20 of the main body 10 and the connecting channel 40 of the accessory unit 30. Referring to FIG. 8B, the contact point 81 may include a rotation contact point 81a, which wraps an entire circumferential surface of the connecting rod 20 with a certain width, and a stationary contact point 81b that is disposed on the inner surface of the connecting channel 40 and in contact with the rotation contact point 81a. Although not illustrated, the rotation contact point 81a of the connecting rod 20 may be electrically connected to a processing unit disposed inside the main body 10, and the stationary contact point 81b may be electrically connected to the keyboard 50 of the accessory unit 30. As a result, the signals from the keyboard 50 can be transmitted to the main body 10 through the contact point 81.

Figure 9A:
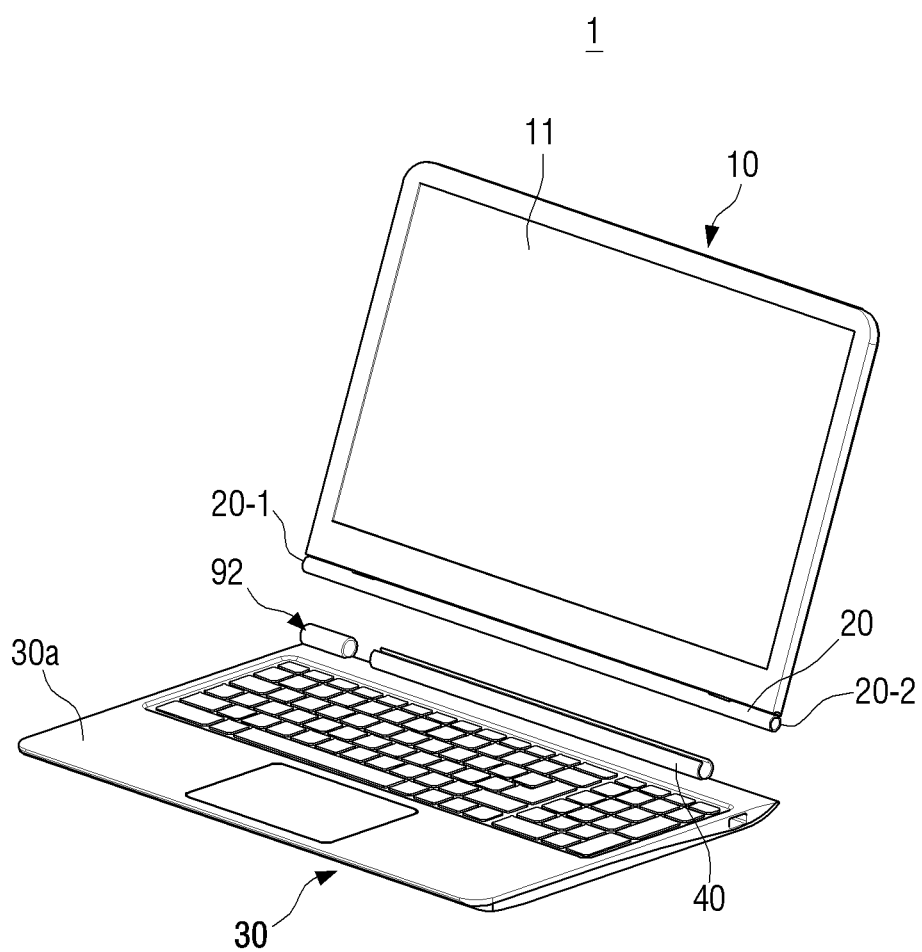
FIG. 9A is a perspective view illustrating a display apparatus having a connector as one example of electric connection according to an embodiment of the present general inventive concept.

Alternatively, a connector may be used as the electrical connection structure. FIG. 9A is a perspective view illustrating a display apparatus having the connector as an example of electric connection according to embodiments of the present general inventive concept, and FIG. 9B is a partially sectional view schematically illustrating connection of the connector illustrated in FIG. 9A.

Figure 9B:
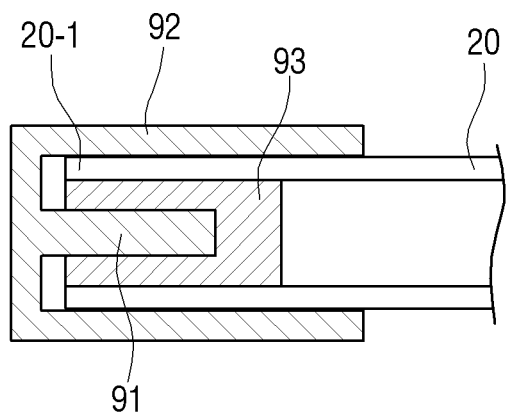
FIG. 9B is a sectional view illustrating the connection of a female connector of the connecting rod and a male connector of the connecting channel as illustrated in FIG. 9A.

Referring to FIGS. 9A and 9B, the display apparatus 1 according to embodiments of the present general inventive concept may include a male connector 91 disposed on the front surface 30a of the accessory unit 30 in a straight line with the connecting channel 40. As illustrated in FIG. 9B, the male connector 91 may be disposed inside a protection cover 92. The male connector 91 may be spaced apart a predetermined distance from the connecting channel 40.

A female connector 93, which corresponds to the male connector 91 disposed the accessory unit 30, may be disposed in each of the opposite ends of the connecting rod 20. The male connector 91 and female connector 93 may be formed in a separable structure so that when the connecting rod 20 is coupled to and separated from the connecting channel 40, the male connector 91 and female connector 93 can be coupled to and separated from each other. Alternatively, the female connector 93 may be disposed in only one end of the connecting rod 20. However, in the display apparatus 10 according to embodiments of the present general inventive concept, two female connectors 93 may be disposed at the opposite ends of the connecting rod 20, since the main body 10 can be coupled to the accessory unit 30 in two kinds of ways, so that the main body 10 and the accessory unit 30 can be electrically connected to each other regardless of the two kinds of connection ways. FIG. 9B illustrates only the structure of the female connector 93 provided on an end 20-1 of the connecting rod 20. However, another female connector 93 having the same structure may be provided on the other end 20-2 of the connecting rod 20. The female connector 93 and male connector 91 provided in the main body 10 and accessory unit 30 may be properly formed depending on the number of electrical signals that need to transmit between the main body 10 and the accessory unit 30.

Hereinafter, a method of using a display apparatus according to embodiments of the present general inventive concept having the structure as described above will be explained in detail.

The display apparatus 1 according to embodiments of the present general inventive concept can use only the main body 10 in a state that the accessory unit 30 is separated from the main body 10. For example, if the main body 10 is a tablet PC, the tablet PC can be used without the keyboard of the accessory unit 30.

If a user wants to utilize the keyboard 50, the user may couple the keyboard apparatus of the accessory unit 30 to the main body 10. When the accessory unit 30 is coupled to the main body 10, the user may align an end of the connecting rod 20 to an end of the connecting channel 40, namely, the insert end 40-1, and insert the connecting rod 20 into the connecting channel 40. When the main body 10 is pushed in the lengthwise direction of the connecting channel 40 of the accessory unit 30, as illustrated in FIG. 4, the connecting rod 20 is moved along the connecting channel 40 so that the accessory unit 30 is coupled to the main body 10. At this time, in order to prevent the pair of fixing members 21 from interfering with the connecting channel 40, the fixing members 21 are aligned to the opening 44 of the connecting channel 40. In embodiments of the present general inventive concept, the fixing members 21 can be inserted into the opening 44 without interference with the connecting channel 40 when the main body 10 is inserted in a manner approximately perpendicular to the front surface 30a of the accessory unit, since the opening 44 of the connecting channel 40 is formed in a direction perpendicular to the front surface 30a of the accessory unit 30. After the main body 10 is pushed to the end when positioned in a manner approximately perpendicular to the accessory unit 30, the coupling of the main body 10 and accessory unit 30 is completed.

After the coupling is complete, the pair of fixing members 21 of the main body 10 may be located beyond the opposite ends of the connecting channel 40. At this time, since the main body 10 is supported by the friction force between the outer surface of the connecting rod 20 and the inner surface of the connecting channel 40, even when connection of the main body 10 and the accessory unit 30 is complete, the main body 10 remains perpendicular to the accessory unit 30. As a result, the user, depending on his or her needs, can rotate the main body 10 so that the angle θ between the main body 10 and the accessory unit 30 is obtuse as illustrated in FIG. 1. As a result, the user can use the display apparatus 1 according to embodiments of the present general inventive concept like conventional notebook computers.

Figure 6:
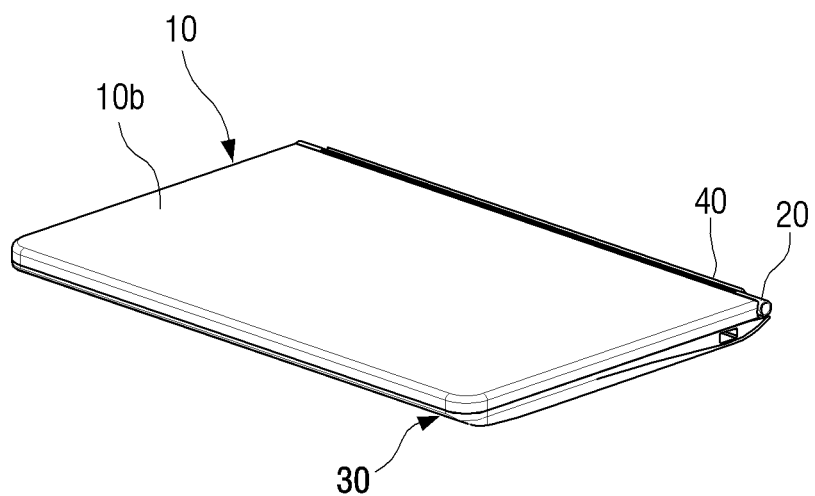
FIG. 6 is a perspective view illustrating a state in which the main body is covered by a top surface of the accessory unit after the main body is connected to the accessory unit as illustrated in FIG. 4.

After usage of the display apparatus 1 is complete, the user can cover the accessory unit 30 with the main body 10, as illustrated in FIG. 6. In other words, the main body 10 can be covered so that the touch screen 11 of the main body 10 is placed on the keyboard 50 of the accessory unit 30. Accordingly, the touch screen 11 is not exposed to the outside, and therefore it is convenient to carry the display apparatus 1 in a manner similar to carrying conventional notebook computers.

Also, the display apparatus 1 according to embodiments of the present general inventive concept can be used as the tablet PC. For this, the user separates the main body 10 from the accessory unit 30. At this time, if the user pushes the main body 10 in a direction parallel to the connecting channel 40 of the accessory unit 30, the connecting rod 20 of the main body 10 may become separated from the connecting channel 40 of the accessory unit 30. At this time, the pair of fixing members 21 of the main body 10 is aligned to the opening 44 of the connecting channel 40 of the accessory unit 30. Accordingly, since the fixing members 21 do not interfere with the connecting channel 40, the connecting rod 20 can be separated from the connecting channel 40.

Figure 7:
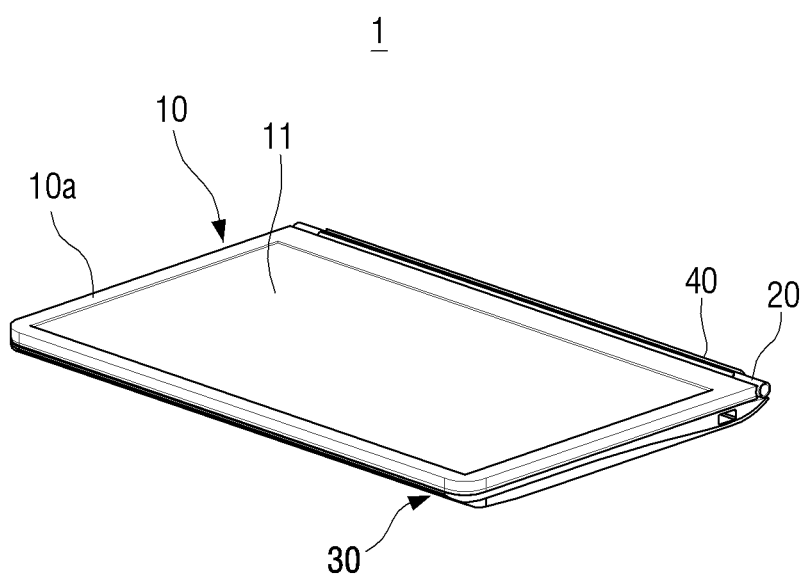
FIG. 7 is a perspective view illustrating a state in which the main body is covered by a top surface of the accessory unit after the main body is connected to the accessory unit as illustrated in FIG. 5.

Next, the user rotates the main body 10 approximately 180 degrees so that the touch screen 11 does not face the keyboard 50 of the accessory unit 30. In other words, the rear surface 10b of the main body 10 is caused to face the keyboard 50. As a result, the second end 20-2 of the connecting rod 20 of the main body 10 faces the entrance 40-1 of the connecting channel 40 of the accessory unit 30. In this state, the connecting rod 20 is inserted into the connecting channel 40 so that the main body 10 is coupled to the accessory unit 30. At this time, the rear surface 10b of the main body 10 faces the keyboard 50 of the accessory unit 30. In this state, the user rotates the main body 10 to be in contact with the front surface 30a of the accessory unit 30, thereby folding the display apparatus 1. As a result, the rear surface 10b of the main body 10 is placed on the keyboard 50 of the accessory unit 30, and thus the touch screen 11 of the main body 10 is exposed to the outside, as illustrated in FIG. 7. Accordingly, the user can use the display apparatus 1 according to embodiments of the present general inventive concept like the tablet PC.

Figure 10:
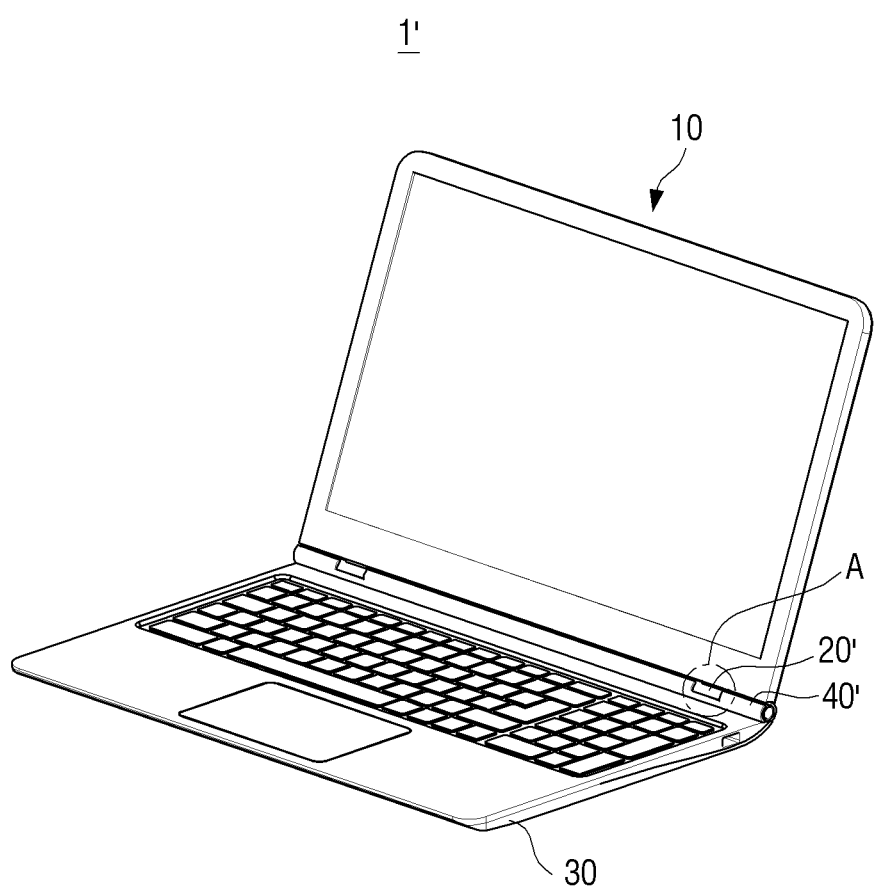
FIG. 10 is a perspective view illustrating a display apparatus according to another embodiment of the present general inventive concept.

FIG. 10 is a perspective view illustrating a display apparatus 1' according to another embodiment of the present general inventive concept.

Referring to FIG. 10, the display apparatus 1' according to embodiments of the present general inventive concept includes a main body 10 and an accessory unit 30.

Figure 11:
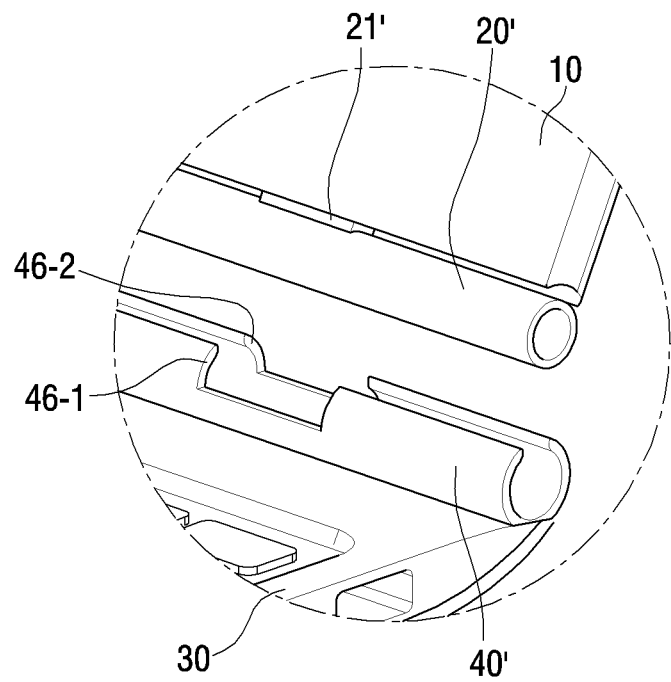
FIG. 11 is a partially enlarged perspective view illustrating a connecting rod and a connecting channel of the A portion of FIG. 10 when a main body and an accessory unit of the display apparatus of FIG. 10 are separated from each other.

The main body 10 and the accessory unit 30 are similar to those of the display apparatus 1 according to the above-described embodiments, and therefore detailed descriptions thereof will be omitted. However, as illustrated in FIG. 11, there is a difference to the above-described embodiments in that a pair of fixing members 21', which fixes a connecting rod 20' to the main body 10, may be formed inside a certain distance away from opposite ends of the main body 10 than the fixing members 21 described above. FIG. 11 is a partially enlarged perspective view illustrating the connecting rod 21' and a connecting channel 40' of the A portion of FIG. 10 when the main body 10 and the accessory unit 30 of the display apparatus 1' are separated from each other. Accordingly, it is convenient when the fixing member 21' is disposed apart a certain distance from one end of the main body 10 because interference of the connector is avoided when using the connector connection.

Also, the connecting channel 40' disposed in the accessory unit 30 may be formed to have a length corresponding to the width of the accessory unit 30, and may be provided with a pair of fixing member grooves 46-1 and 46-2 formed to correspond to the pair of fixing members 21' therein. The fixing member grooves 46-1 and 46-2 may be formed so that, when the main body 10 is rotated, the pair of fixing members 21' do not interfere with the connecting channel 40'. For example, the fixing member groove 46-1 on the front portion of the connecting channel 40' is formed so that, when covering the main body 10 with respect to the accessory unit 30, the main body 10 can be rotated until the main body 10 is in contact with the front surface of the accessory unit 30. Also, the fixing member groove 46-2 on the rear portion of the connecting channel 40' is formed so that, when rotating the main body 10 in a reverse direction, the main body 10 can be rotated until the main body 10 and the accessory unit 30 are placed on the same plane, that is, the angle θ between the main body 10 and the accessory unit 30 becomes 180 degrees.

Also, the display apparatus 1 according to embodiments of the present general inventive concept may be formed so that a digitizer pen 100 may be stored in the connecting rod 20 of the main body 10.

Figure 12A:
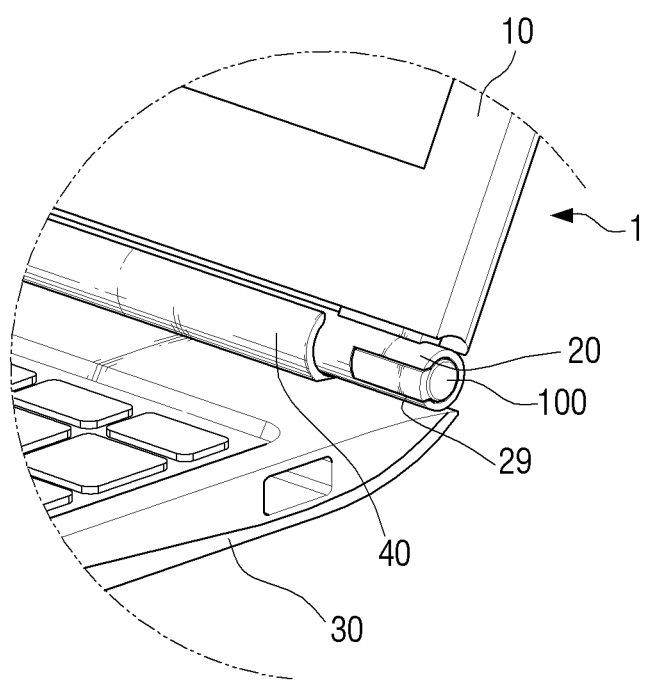
Figure 12B:
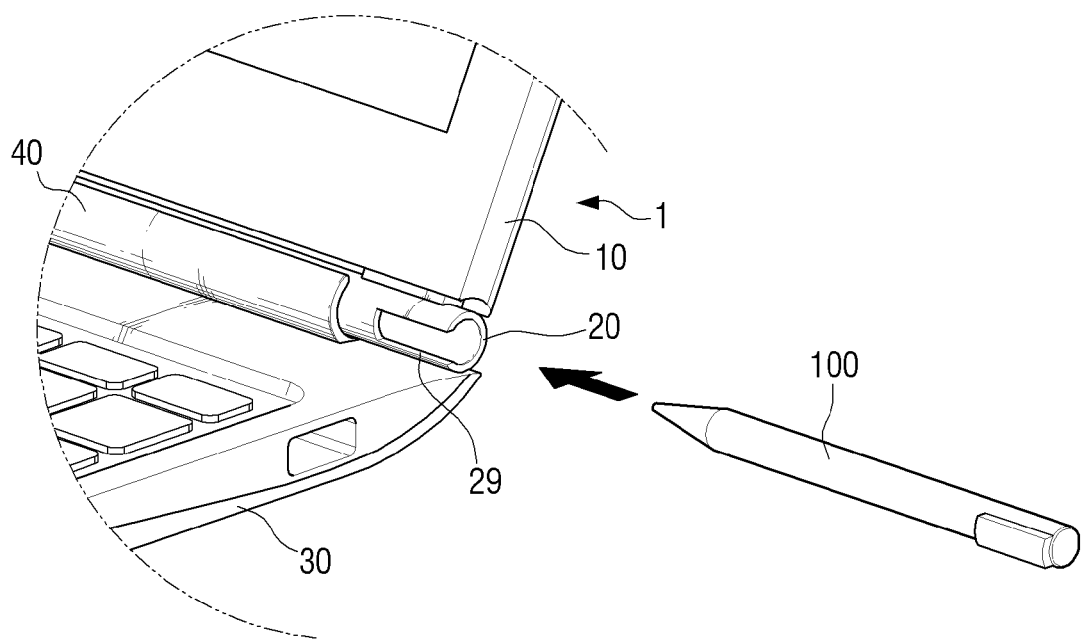
FIG. 12B is a partially perspective view illustrating the display apparatus of FIG. 12A when the digitizer pen is separated from the connecting rod.

FIGS. 12A and 12B illustrate the display apparatus 1 in which the digitizer pen 100 is stored in the connecting rod 20 of the main body 10. FIG. 12A is a partially perspective view illustrating a display apparatus according to embodiments of the present general inventive concept with a connecting rod in which a digitizer pen 100 is kept, and FIG. 12B is a partially perspective view illustrating the display apparatus of FIG. 12A in which the connecting rod is separated from the digitizer pen 100.

A slot 29 may be provided in one end of the connecting rod 20 of the main body 10 so that the digitizer pen 100 can easily be separated from, and securably inserted into, the connecting rod 20. Accordingly, when the user wants to use the digitizer pen 100, the user can easily pull out the digitizer pen 100 from the connecting rod 20. After use, the user can easily insert and keep the digitizer pen 100 connected within the connecting rod 20. Therefore, use and storage of the digitizer pen 100 is very convenient.

Also, according to embodiments of the present general inventive concept, since the digitizer pen 100 can be stored in the connecting rod 20 of the main body 10, it is not required to form a separate space to hold the digitizer pen 100 in the main body 10. Therefore, the efficiency of space may be improved.

Figure 13:
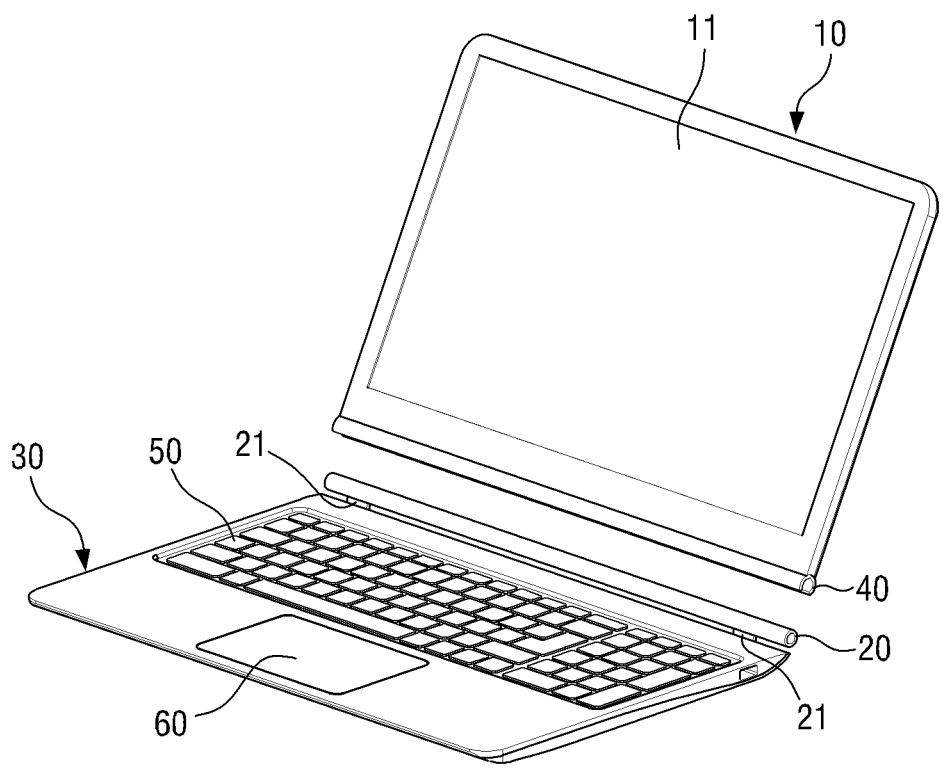
FIG. 13 is an exploded perspective view illustrating a display apparatus according to another embodiment of the present general inventive concept.

In the above explanation, the connecting rod 20 is disposed in the main body 10, and the connecting channel 40 is disposed in the accessory unit 30. However, in contrast, the display apparatus may be configured so that the connecting rod is disposed in the accessory unit, and the connecting channel is disposed in the accessory unit, as illustrated in FIG. 13. The display apparatus having the aforesaid structure is different to that of the above-described display apparatus 1 only in the installation positions of the connecting rod and connecting channel, but is the same as the above-described display apparatus in the other things. Therefore, detailed descriptions thereof will be omitted.

Also, in the embodiments of the present general inventive concept as described above, the main body is formed as a tablet PC. However, the present general inventive concept is not limited to when the main body is a tablet PC. The present general inventive concept can be applied to all electronic apparatuses having a main body to which an accessory unit can be coupled to use, and a touch screen disposed on a front surface of the main body. For example, the present general inventive concept can be applied to smart phones, eBook devices, etc.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A display apparatus comprising:
a main body including a touch screen disposed on a front surface thereof;
an accessory unit rotatably disposed with respect to the main body;
a connecting rod disposed in a side surface of the main body parallel to the side surface of the main body; and
a connecting channel disposed to project in a direction perpendicular to a front surface of the accessory unit from a portion of the front surface of the accessory unit adjacent to a side surface of the accessory unit and formed in an arc shape to surround the connecting rod and parallel to a side surface of the accessory unit, the connecting channel being formed so that the connecting rod is inserted in or separated from the connecting channel in a lengthwise direction thereof,
wherein the connecting rod is disposed to be spaced apart from the side surface of the main body by a pair of fixing members formed on the side surface of the main body.

2. The display apparatus of claim 1, wherein
the connecting rod has a circular cross-section, and
the connecting channel has an arc cross-section corresponding to the circular cross-section.

3. The display apparatus of claim 2, wherein
the connecting rod and the connecting channel are formed to generate a friction force that can support a weight of the main body when the connecting rod is inserted into the connecting channel.

4. The display apparatus of claim 1, wherein
a top portion of the connecting channel has an opening so that the pair of fixing members can pass through the connecting channel, and
the connecting channel comprises a front portion and a rear portion that are formed to pass through a gap between the connecting rod and the side surface of the main body or the accessory unit.

5. The display apparatus of claim 1, wherein
a length of the connecting channel is shorter than a distance between the pair of fixing members.

6. The display apparatus of claim 1, wherein
opposite ends of the connecting rod are formed to be inserted into the connecting channel,
the front surface of the main body faces the front surface of the accessory unit when the connecting rod is inserted in the connecting channel from a first end of the connecting rod, and
a rear surface of the main body faces the front surface of the accessory unit when the connecting rod is inserted in the connecting channel from a second end of the connecting rod.

7. The display apparatus of claim 1, wherein
at least one contact point to electrically connect the main body and the accessory unit is provided between the connecting rod and the connecting channel.

8. The display apparatus of claim 1, wherein
the main body comprises a tablet PC, and
the accessory unit comprises a keyboard.

9. The display apparatus of claim 8, wherein
a rechargeable battery is disposed in the accessory unit.

10. The display apparatus of claim 8, wherein
at least one USB port and at least one memory slot are disposed in the accessory unit.

11. The display apparatus of claim 1, further comprising:
a male connector disposed in a side of the connecting channel and spaced apart from the connecting channel, and
a female connector disposed in each of the opposite ends of the connecting rod and separately connected to the male connector.

12. The display apparatus of claim 1, wherein
a digitizer pen is detachably disposed in an end of the connecting rod.

13. A tablet PC comprising:
a main body including a touch screen disposed on a front surface thereof; and
a connecting rod disposed in a side surface of the main body parallel to the side surface of the main body and spaced apart a predetermined distance from the side surface,
wherein the connecting rod can be inserted into a connecting channel projecting in a direction perpendicular to a front surface of a keyboard and formed in an arc shape to surround the connecting rod on the front surface of the keyboard, and the connecting channel comprises an opening formed in a top portion of the connecting channel.

14. The tablet PC of claim 13, wherein
the connecting rod is fixed to the side surface of the main body by a pair of fixing members.

15. The tablet PC of claim 14, wherein
the connecting rod has the same length as the main body; and
the pair of fixing members are disposed to fix opposite end portions of the connecting rod.

16. A keyboard apparatus comprising:
an accessory unit including a keyboard disposed on a front surface thereof; and
a connecting channel disposed to project from an end of the front surface of the accessory unit and formed parallel to the keyboard, the connecting channel comprising an opening formed in a top portion of the connecting channel, wherein a connecting rod disposed in a side surface of a tablet PC can be removably inserted into the connecting channel, and the connecting channel projects in a direction perpendicular to the keyboard and is formed in an arc shape to surround the connecting rod.

17. The keyboard apparatus of claim 16, wherein the connecting rod has a circular cross-section, and the connecting channel has an arc cross-section corresponding to the circular cross-section.

* * * * *